United States Patent
Chang

(10) Patent No.: US 6,494,470 B2
(45) Date of Patent: Dec. 17, 2002

(54) FRONT WHEELS ASSEMBLY FOR A SCOOTER

(75) Inventor: Wen-Hwan Chang, Taichung (TW)

(73) Assignee: Tai E. International, Tapei (TW)

( * ) Notice: Subject to any disclaimer, the term of this patent is extended or adjusted under 35 U.S.C. 154(b) by 0 days.

(21) Appl. No.: 09/854,253

(22) Filed: May 11, 2001

(65) Prior Publication Data

US 2002/0167146 A1 Nov. 14, 2002

(51) Int. Cl.⁷ .............................. B62M 1/00
(52) U.S. Cl. ..................... 280/87.041; 280/263
(58) Field of Search ............ 280/87.01, 87.021, 280/87.041, 87.042, 87.043, 87.05, 87.03, 809, 842, 14.28, 263, 264, 11, 27; 180/180, 181; D21/423; D12/8

(56) References Cited

U.S. PATENT DOCUMENTS

| | | | | |
|---|---|---|---|---|
| 1,874,792 A | * | 8/1932 | Myers | 280/87.042 |
| D208,791 S | * | 10/1967 | Purdy | D21/423 |
| 4,274,647 A | * | 6/1981 | Drake, Jr. | 280/87.042 |
| 4,775,162 A | * | 10/1988 | Chao | 280/87.041 |
| 5,816,597 A | * | 10/1998 | Tsai | 280/226.1 |
| 6,234,501 B1 | * | 5/2001 | Chen | 280/87.041 |
| 6,282,981 B1 | * | 9/2001 | Tsai | 74/551.3 |
| 6,286,843 B1 | * | 9/2001 | Lin | 280/11.28 |
| D452,886 S | * | 1/2002 | Wang et al. | D21/423 |

FOREIGN PATENT DOCUMENTS

FR   2607713   *  6/1988

OTHER PUBLICATIONS

US Patent Application Publication 2001/0033069—dated Oct. 2001.*
US Patent Application Publication 2001/0040352—dated Nov. 2001.*
US Patent Application Publication 2002/0089136—dated Jul. 2002.*

* cited by examiner

Primary Examiner—Brian L. Johnson
Assistant Examiner—Bryan Fischmann
(74) Attorney, Agent, or Firm—Varnum, Riddering, Schmidt & Howlett LLP

(57) ABSTRACT

A front wheel assembly for a scooter. The scooter has a head tube provided at a front end thereof, a stem extending through the head tube, and a handlebar provided on a top of the stem. The front wheel assembly has a seat mounted at a lower end of the stem. A longitudinal bar is pivotally mounted in the seat. A first wheel is provided at a front end of the longitudinal bar. An axle is pivotally provided at a rear end of the longitudinal bar. A pair of second wheels, one of the pair of wheels mounted at each end of the axle. Whereby, when a user turns the handlebar, the scooter can follow a twisting path.

3 Claims, 5 Drawing Sheets

FRONT WHEELS ASSEMBLY FOR A SCOOTER

BACKGROUND OF THE INVENTION

1. Field of the Invention

The present invention is related to a scooter, and more particularly to a front wheel assembly for the scooter.

2. Background Art

A scooter generally has a platform mounted between a front wheel and a rear wheel, and a handlebar provided above the front wheel for a user to maintain balance. The user steps on the platform with one foot, and pushes the scooter forward by the other foot thrusting against the ground. However, the scooter only can move along a straight path, so the user will soon lose interest in the monotonous play mode.

Therefore, the invention provides a front wheel assembly for a scooter to mitigate and/or obviate the aforementioned problem.

SUMMARY OF THE INVENTION

The main objective of the invention is to provide a front wheel assembly which can assist a scooter to follow a twisting path.

Other objects, advantages and novel features of the invention will become more apparent from the following detailed description when taken in conjunction with the accompanying drawings.

DETAILED DESCRIPTION OF THE PREFERRED EMBODIMENT

Figure 1:
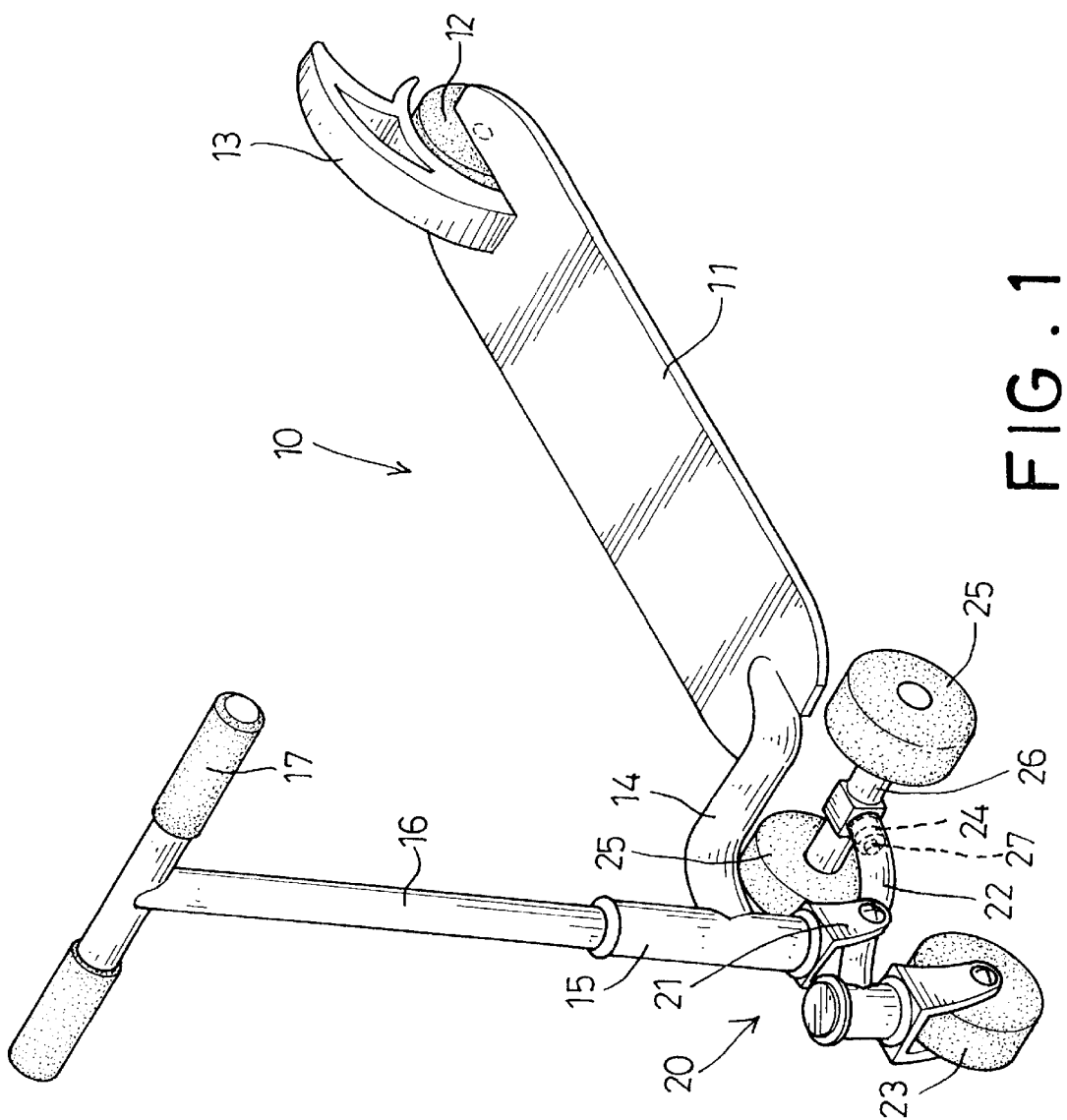
FIG. 1 is a perspective view of a front wheel assembly for a scooter in accordance with the invention.
Figure 2:
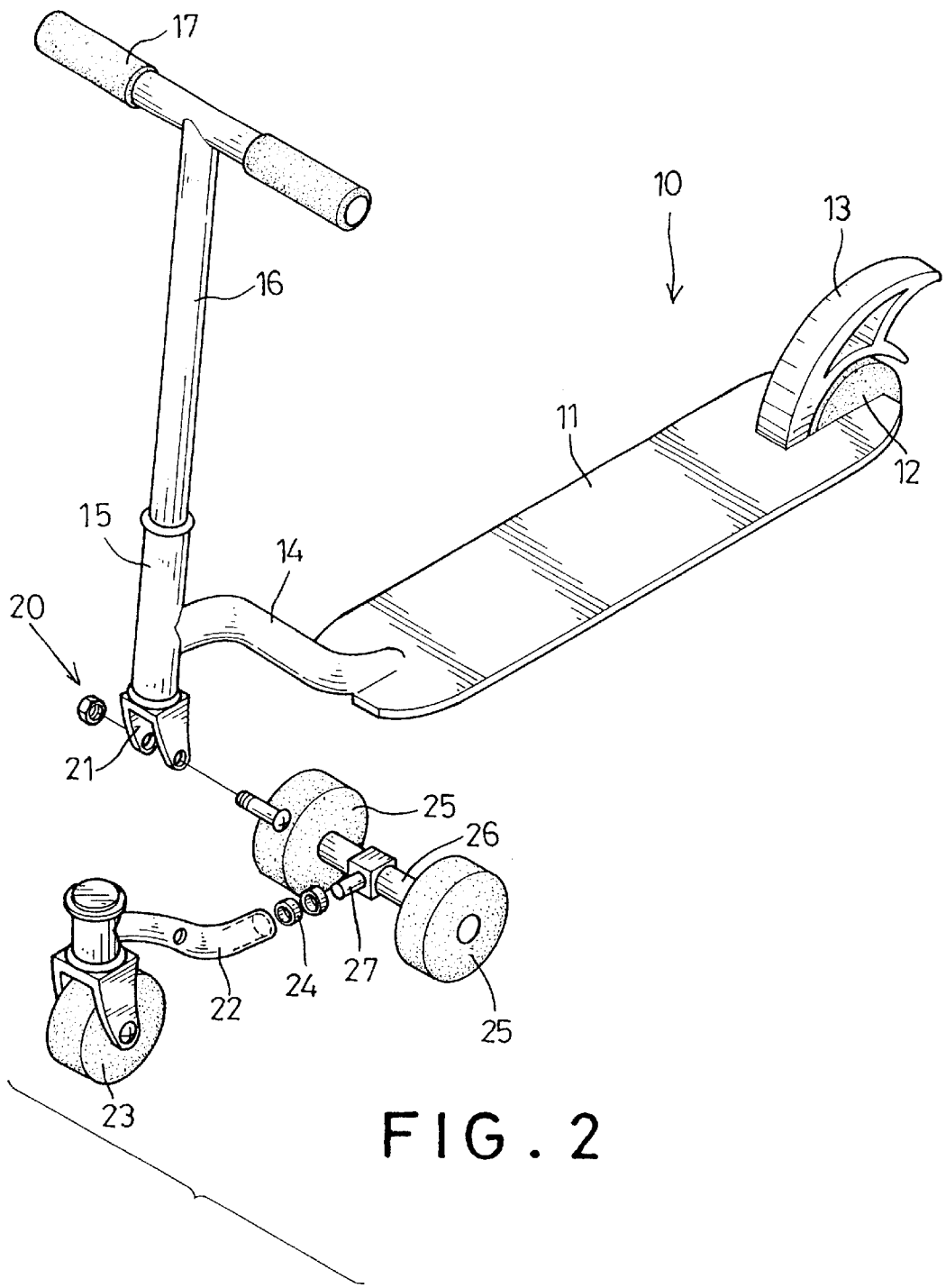
FIG. 2 is an exploded perspective view of the front wheel assembly.

Referring to FIGS. 1 and 2, a front wheel assembly (20) for a scooter (10) in accordance with the invention is fitted to a platform (11) with a rear wheel (12) mounted at a rear end of the platform (11) and a brake (13) provided over the rear wheel (12). A head tube (15) is connected with a front end of the platform (11) by a linkage (14). A stem (16) is extended through the head tube (15) and a handlebar (17) is provided at a top of the stem (16).

The front wheel assembly (20) is mounted beneath the head tube (15). The front wheel assembly (20) has a seat (21) mounted at a lower end of the stem (16) for being controlled by the handlebar (17), and the seat (21) is pivotally mounted on a middle portion of a longitudinal bar (22). A first wheel (23) is provided at a front end of the longitudinal bar (22) and an axle (26) is provided at a rear end of the longitudinal bar (22). A pair of second wheels (25) is provided, one of the pair of wheels mounted at each end of the axle (26). The axle (26) has a stub (27) formed at a middle portion thereof and received in the rear end of the longitudinal bar (22). The longitudinal bar (22) has bearings (24) received therein and provided on the stub (27).

Figure 3:
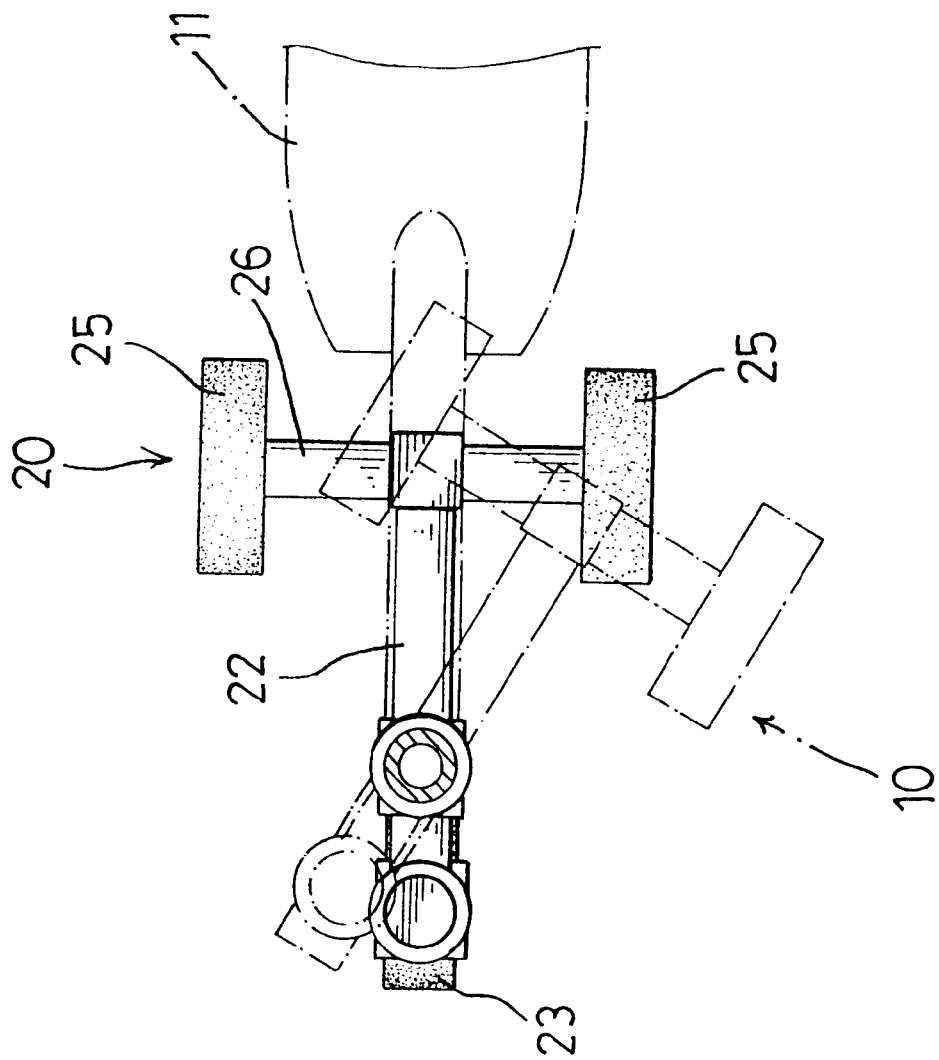
FIG. 3 is a top view showing the front wheel assembly being turned relative to a platform of the scooter.
Figure 4:
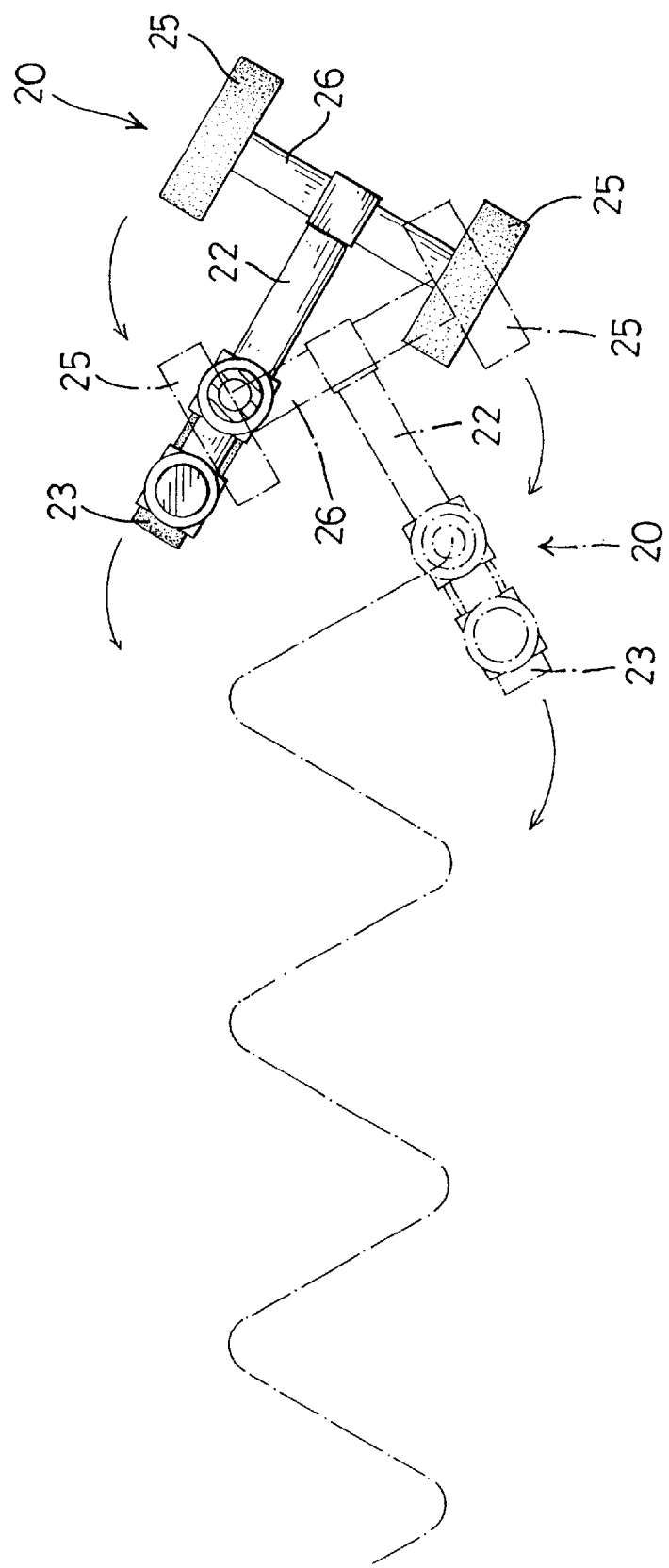
FIG. 4 is a top view showing the front wheel assembly following a sharp zigzag route.
Figure 5:
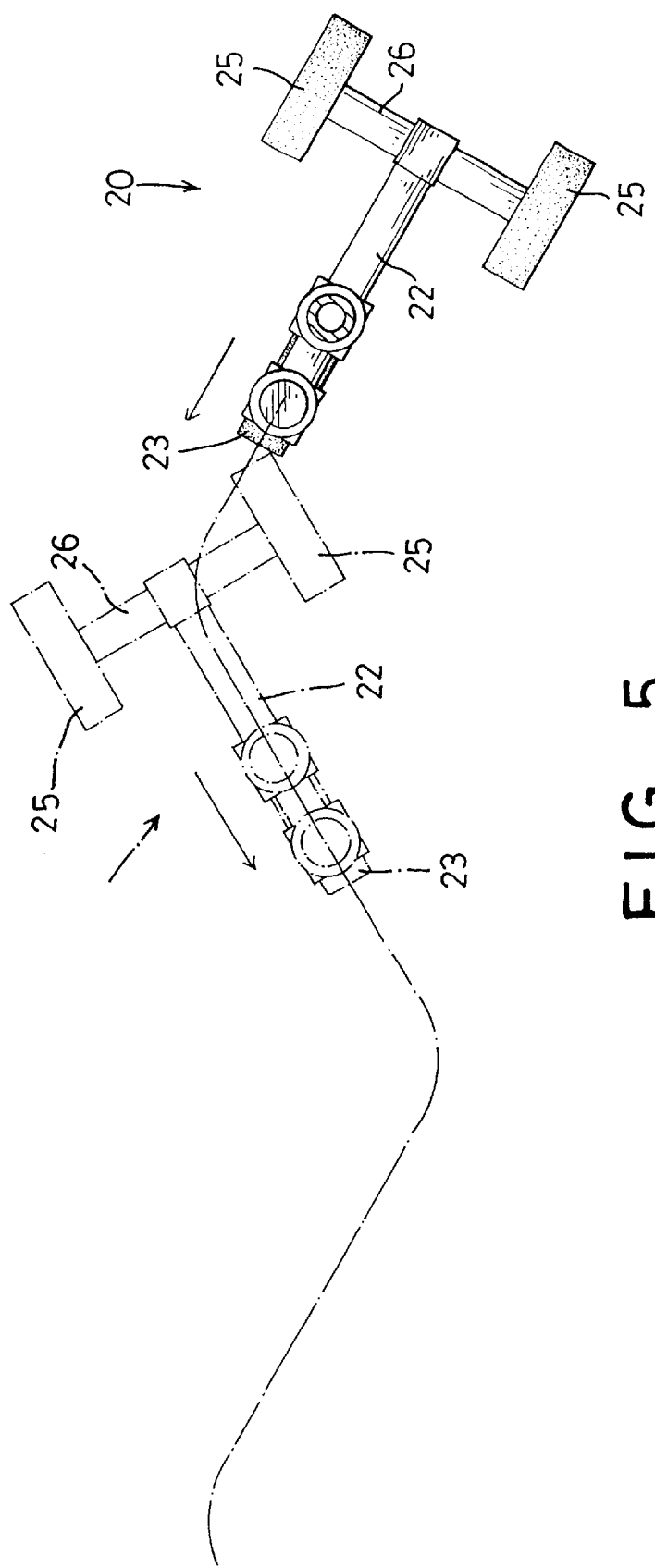
FIG. 5 is a top view showing the front wheel assembly running along a gentle zigzag route when the user turns the handlebar slowly.

Referring to FIG. 3, in operating, a user rests one foot on the platform (11), holds the handlebar (17) with both hands, and propels the scooter forward by the other foot thrusting against the ground. In movement of the scooter, the user can turn the handlebar (17) left and right to pivot the front wheel assembly (20) about the head tube (15), so the scooter can follow closely a sharply twisting path. When the user turns the handlebar (17) quickly, the scooter follows a sharp twisting path as shown in FIG. 4. When the user turns the handlebar( 17) slowly, the scooter follows a gently twisting path as shown in FIG. 5.

In a case that the ground is rough, because the longitudinal bar (22) of the front wheel assembly (20) is pivotally mounted on the seat (21), the first wheel (23) and the second wheels (25) remain permanently in contact with the ground so as to maintain stability of the scooter. Furthermore, the stub (27) of the axle (26) being pivotally received in the the longitudinal bar (22) via the bearing (24) permits the second wheels (25) to pivot relative to the first wheel (23) such that the scooter can incline when turning sharply.

Because the scooter can follow a twisting path, users will have a lot of interest in using the scooter.

It is to be understood, however, that even though numerous characteristics and advantages of the present invention have been set forth in the foregoing description, together with details of the structure and function of the invention, the disclosure is illustrative only, and changes may be made in detail especially in matters of shape, size, and arrangement of parts within the principles of the invention to the full extent indicated by the broad general meaning of the terms in which the appended claims are expressed.

What is claimed is:

1. A front wheel assembly for a scooter having a platform with a rear end and a front end, a rear wheel mounted to the rear end of the platform, a head tube (15) provided at the front end of the platform, a stem (16) extending through the head tube (15), and a handlebar (17) provided on a top of the stem (16), the front wheel assembly comprising:

a seat (21) adapted to be mounted at a lower end of the stem (16);

a longitudinal bar (22) configured to be pivotally mounted in the seat (21);

a first wheel (23) provided at a front end of the longitudinal bar (22);

an axle (26) provided at a rear end of the longitudinal bar (22) and the axle being pivotal relative to the longitudinal bar; and a pair of second wheels (25), one of the pair of wheels mounted at each end of the axle (26).

2. The front wheel assembly as claimed in claim 1, wherein the axle (26) has a stub (27) formed at a middle portion thereof and received in the rear end of the longitudinal bar (22).

3. The front wheel assembly as claimed in claim 2 further comprising bearings (24) provided between the stub (27) and the longitudinal bar (22).

* * * * *